United States Patent [19]
Gandhi et al.

[11] Patent Number: 5,583,656
[45] Date of Patent: Dec. 10, 1996

[54] METHODS AND APPARATUS FOR ATTACHING COMPRESSED LOOK-UP TABLE (LUT) REPRESENTATIONS OF N TO M-DIMENSIONAL TRANSFORMS TO IMAGE DATA AND FOR PROCESSING IMAGE DATA UTILIZING THE ATTACHED COMPRESSED LUTS

[75] Inventors: Bhavan R. Gandhi, Rochester; James R. Sullivan, Spencerport, both of N.Y.

[73] Assignee: Eastman Kodak Company, Rochester, N.Y.

[21] Appl. No.: 999,631

[22] Filed: Dec. 31, 1992

[51] Int. Cl.$^6$ ............... G02B 23/08; G02B 23/00; G03B 21/56
[52] U.S. Cl. ............... 358/426; 358/403; 358/404; 358/444
[58] Field of Search ............... 358/403, 426, 358/133, 136, 404, 444; 382/54, 56, 47; 395/164, 165, 166, 131; 341/164

[56] References Cited

U.S. PATENT DOCUMENTS

| | | | |
|---|---|---|---|
| 4,037,249 | 7/1977 | Pugsley ............... | 358/76 |
| 4,500,919 | 2/1985 | Schreiber ............... | 358/78 |
| 4,712,140 | 12/1987 | Mintzer et al. ............... | 358/260 |
| 4,797,729 | 1/1989 | Tsai ............... | 358/13 |
| 4,843,632 | 6/1989 | Lee et al. ............... | 382/56 |
| 4,870,479 | 9/1989 | Dubner ............... | 358/13 |

(List continued on next page.)

FOREIGN PATENT DOCUMENTS

| | | | |
|---|---|---|---|
| 61-90575 | 5/1986 | Japan ............... | H04N 5/202 |
| 63-164574 | 7/1988 | Japan ............... | H04N 1/41 |
| 1-51889 | 2/1989 | Japan ............... | H04N 9/79 |
| 1-161993 | 6/1989 | Japan ............... | H04N 1/04 |
| 1-305792 | 12/1989 | Japan . | |
| 2-237269 | 9/1990 | Japan ............... | H04N 1/41 |
| 2-262785 | 10/1990 | Japan ............... | H04N 7/133 |
| 3-53767 | 3/1991 | Japan ............... | H04N 1/41 |

OTHER PUBLICATIONS

F. W. Billmeyer, Jr. and M. Saltzman; "Principles of Color Technology". Published by John Wiley & Sons, pp. 81–87.
Bhavan R. Gandhi and James R. Sullivan; "Methods and Apparatus for Processing Image Data Utilizing Stored Compressed Look-Up Table (LUT) Representations of N to M-Dimensional Transforms"; Copending U.S. Patent Application.
R. W. G. Hunt; "Measuring Colour"; Published by John Wiley and Sons, pp. 197–198.
H. J. Trussell; "Application of Set Theoretic Methods to Color Systems"; Published in Color Research and Applications, vol. 16, No. 1, pp. 31–41.
T. J. Lynch; "Data Compression Techniques and Applications"; Published by Van Nostrand Reinhold 1985.

(List continued on next page.)

Primary Examiner—Sandra L. O'Shea
Assistant Examiner—John Ning
Attorney, Agent, or Firm—Joseph J. Kaliko

[57] ABSTRACT

Each member of a set of transform representative data structures (such as look-up tables (LUTs), each representing an N TO M-dimensional transform), is stored in compressed form in a storage device included in, or which is otherwise accessible to, an image processing device or system. Each stored transform representative data structure may then, according to one embodiment of the invention, be selectively attached to image data being processed by the image processing device or system. According to a further aspect of the invention, image data, having compressed transform representative data attached thereto, may be processed utilizing methods and apparatus operative to detach, decompress and apply the transform represented by the decompressed transform representative data, to a decompressed version of the image data. The result of the aforementioned process is for image data to be transformed according to a transform specified by information previously attached to the image data.

26 Claims, 2 Drawing Sheets

U.S. PATENT DOCUMENTS

| | | | |
|---|---|---|---|
| 4,885,636 | 12/1989 | Sullivan | 358/133 |
| 4,914,508 | 4/1990 | Music et al. | 358/13 |
| 4,941,038 | 7/1990 | Walowit | 358/80 |
| 5,051,745 | 9/1991 | Katz | 341/51 |
| 5,060,060 | 10/1991 | Udagawa et al. | 358/80 |
| 5,065,229 | 11/1991 | Tsai et al. | 358/21 |
| 5,067,019 | 11/1991 | Juday et al. | 358/160 |
| 5,070,532 | 12/1991 | Faul et al. | 382/56 |
| 5,079,621 | 1/1992 | Daly et al. | 358/13 |
| 5,086,439 | 4/1992 | Asai | 375/122 |
| 5,119,442 | 6/1992 | Brown | 382/41 |
| 5,124,688 | 6/1992 | Rumball | 340/703 |
| 5,130,701 | 7/1992 | White | 340/701 |
| 5,208,872 | 5/1993 | Fisher | 382/42 |
| 5,220,621 | 6/1993 | Saitoh | 382/22 |

OTHER PUBLICATIONS

D. A. Huffman; "A Method for the Construction of Minimum Redundancy Codes"; Published in the Proceedings of the IRE, vol. 40, pp. 1098–1101.

A. Lempel and J. Ziv; "A Universal Algorithm for Sequential Data Compression"; Published in the IEEE Transactions On Information Theory, vol. IT–23(3), pp. 337–343.

W. B. Pennebaker, J. L. Mitchell, G. G. Langdon, Jr., R. B. Arps; "An Overview of the basic principles of the Q–Coder adaptive binary arithmetic coder" appearing in the IBM Journal of Research and Development, vol. 32 (6), pp. 715–726.

Aldus Photostyler, publish 3, 1992.

PK Ware Inc. 9025 N. Deerwood Dr. Brown Deer WI. 53223–2437 U.S.A.

Facsimile Technology and Application Handbook second Edition By Artech House Inc. TK 6710.M33 1992.

METHODS AND APPARATUS FOR ATTACHING COMPRESSED LOOK-UP TABLE (LUT) REPRESENTATIONS OF N TO M-DIMENSIONAL TRANSFORMS TO IMAGE DATA AND FOR PROCESSING IMAGE DATA UTILIZING THE ATTACHED COMPRESSED LUTS

BACKGROUND OF THE INVENTION

1. Field of the Invention

The invention relates generally to image processing devices such as, for example, printers, scanners, cameras, digitizers, film writers, photo-CD players, general purpose work stations and the like, and image processing systems that include a plurality of image processing devices, which process image data utilizing one or more N to M-dimensional transforms, where N and M are integers each greater than or equal to one.

More particularly, the invention relates to image processing devices and systems which attach stored compressed look-up table (LUT) representations of the aforementioned transforms (or alternatively, some other type of compressed transform representative data), to image data; and to image processing devices and systems which are capable of processing image data that has compressed transform representative data attached thereto.

In the course of explaining the principles of the invention, the more general term "transform representative data" will sometimes be used, as opposed to the more specific references to compressed "transform representative look-up tables" (LUTs). It should be understood that whenever reference is made to look-up tables, a reference to the more general concept of "transform representative data" is intended to be implied.

In accordance with one aspect of the invention, each LUT in a set of LUTs (where each LUT represents an N TO M-dimensional transform which could be applied to the input data), is stored in compressed form in storage means included in, or which is otherwise accessible to, the image processing device or system. Each stored compressed LUT may then, according to one embodiment of the invention, be selectively attached (appended) to the image data being processed by the image processing device or system.

According to a further aspect of the invention, image data which has compressed transform representative data attached thereto (such as one of the aforementioned compressed transform representative LUTs), may be processed utilizing methods and apparatus operative to: (a) detach the compressed LUT from the image data; (b) decompress the detached LUT (if not otherwise available in decompressed form to transform processing means being utilized to process the image data); (c) decompress the image data (if presented to the image processing device or system in compressed form); and (d) apply the transform represented by the decompressed LUT, utilizing the aforementioned transform processing means, to a decompressed version of the image data. The result of the aforementioned process is for the transform processing means to have available as output, image data transformed in accordance with the transform represented by the compressed LUT previously attached to the image data.

2. Description of the Prior Art

Well known methods and apparatus exist for transforming, with the aid of an image processor, one data representation of an image into another representation of the image within image processing devices and systems. One class of transform which may be applied by an image processor to input image data is referred to herein as "N to M dimensional" transforms, where N and M are integers greater than or equal to 1.

When N and M both equal one, the transform is said to be "one dimensional". An example of a one dimensional transform is a simple tonal re-mapping of monochrome imagery. Otherwise the transform is referred to in the art as being "multi-dimensional". An example of a multi-dimensional transform is a mapping that converts color imagery from one color representation into some other representation.

A specific example of a multi-dimensional transform, presented for the sake of illustration only, is a mapping from a Red, Green Blue (RGB) three color space representation of image data, into a Cyan, Magenta, Yellow, Black (CMYK) four color space representation of the same image data. For the aforementioned transform, N equals 3 and M equals 4.

Other examples of multi-dimensional transforms, together with an indication of specific device environments in which they may be applied, include transforms which take red, green and blue (RGB) response signals from an input scanner and convert the data into the CIE tri-stimulus values (XYZ), and transforms which convert CIELAB image data into cyan, magenta, yellow, and black (CMYK) drive signals for an output printer.

It is well known by those skilled in the art that the aforementioned N to M-dimensional transforms may be implemented using look-up tables (LUTs). For example, an image processor could access the contents of a selected LUT in a prescribed manner (e.g., using image data input into an image processing device or system as an index to the LUT), and output a value stored in the LUT to effectively perform the desired data transformation.

Many image processing devices and systems are also known which utilize data compression techniques to reduce memory requirements and increase process throughput. However, the data compression techniques used in such devices and systems are generally applied only to the actual data being processed (for example, the input image data itself); not to the LUTs used to perform desired data transformation processes.

In other known image processing devices and systems, data compression techniques have been used for purposes unrelated to image processing per se. An example is the video signal processor taught by Yamashita in Japanese Patent Number 61-090575, where data compression is used to perform a LUT conversion process.

In a copending U.S. patent application entitled "Methods and Apparatus for Processing Image Data Utilizing Stored Compressed Look-Up Table (LUT) Representations of N to M Dimensional Transforms", filed on Dec. 31, 1992, assigned to the same assignee as the present invention), methods and apparatus are described for utilizing stored compressed N to M dimensional transform representative LUTs for image processing purposes.

The copending application, hereby incorporated by reference, teaches (for example) the use of stored compressed LUTs to perform device calibration functions, transformations between image data spaces recognized by different devices, etc., by selectively decompressing and applying the transform represented by a given compressed LUT, stored in memory accessible to a transform processor, to the image data being processed.

With the exception of the teachings set forth in the aforementioned incorporated patent application, all of the known image processing devices and systems that utilize LUT representations of N to M-dimensional transforms, store the LUTs in an uncompressed form. As a result, the number of LUTs that are capable of being stored may be subject to image processing device or system dependent memory constraints. The incorporated patent application solves this problem and, among other features, allows a broader range of "follow on" devices (such as different types of output printers, display devices, etc.) to be supported by the image processing device or system performing the transforms.

However, the incorporated application does not address methods and apparatus for selectively attaching a stored compressed LUT to image data and/or being able to utilize image data (whether compressed or uncompressed), with compressed transform representative data attached thereto, for image processing purposes, such as, for example, device calibration, image data space transformation, etc.

It would be desirable to be able to provide methods and apparatus for selectively attaching a stored compressed LUT to image data since, for example, an image data file with an attached "transform", could be created and sent as a package to another image processing device or system. The other device or system would only need to be able to detach and reconstruct the transform to be applied to the image data in the file. Accordingly, only the process used to compress the transform representative data would need to be known by the target device or system; and no further information regarding the transform per se would need to be known or stored at the target.

Given the ability to selectively attach a stored compressed LUT to image data, it would clearly be desirable to provide methods and apparatus for being able to utilize image data with compressed transform representative data attached thereto, for image processing purposes such those described hereinabove.

In addition to the aforementioned incorporated patent application (including prior art referred to therein), and the above referenced Yamashita patent, other recently issued patents illustrate the state of the relevant art of imaging systems which use transform representative LUTs and/or data compression techniques for image processing purposes.

These include, U.S. Pat. No. 5,067,019 to Juday et al.; U.S. Pat. No. 4,914,508, to Music et al.; U.S. Pat. No. 4,797,729, to Tsai; U.S. Pat. No. 4,941,038, to Walowit; Japanese Patent Number 63-164574, to Kawamura; Japanese Patent Number 2-237269, to Murakami; Japanese Patent Number 1-51889, to Yamashita; Japanese Patent Number 1-161993, to Ota; and Japanese Patent Number 2-262785, to Watanabe.

U.S. Pat. No. 5,067,019 to Juday et al., relates to a machine which accepts a real time video image in the form of a matrix of pixels and remaps such image, according to a selectable one of a plurality of mapping functions, to create an output matrix of pixels. For remapping input images from one coordinate system to another, a set of look-up tables is used for the data necessary to perform a particular transform. However, the look-up tables are not stored in compressed form, nor are they attached in compressed form to the image data.

U.S. Pat. No. 4,914,508, to Music et al., relates to a method and system for statistically encoding color video data. In this system, the color components in a picture frame are encoded, compressed and then stored in a look-up table. The LUT itself is not compressed, nor does the LUT consist of N to M-dimensional transform representative data which is compressed and made available to an image processing system in which the represented transform is to be applied. Furthermore, the LUTs described by Music et al., are not attached in compressed form to image data.

U.S. Pat. No. 4,797,729, to Tsai, describes systems and methods for compressing digitized color image signals in real time using a block truncation code. Again, only the data signal is compressed; not a transform representative LUT. Furthermore, there is no teaching of a compressed transform representative LUT being attached to image data for any purpose.

U.S. Pat. No. 4,941,038, to Walowit, which describes a method for processing color image data which converts input RGB color data to output CMY color data, using an intermediate color space; Japanese Patent Number 63-164574, to Kawamura, which relates to a decoding system which utilizes LUTs to decode encoded color image data; Japanese Patent Number 2-237269, to Murakami, which relates to a high efficiency compression recording display system for storing color pictures; Japanese Patent Number 1-51889, to Yamashita, which describes a video signal processor which utilizes data compression techniques; Japanese Patent Number 1-161993, to Ota, which relates to a coding system for color information; and Japanese Patent Number 2-262785, to Watanabe; all call for the use of data compression techniques and/or the use of look-up tables to process image data.

Once again, however, none of the aforementioned patents teach attaching compressed a N to M-dimensional transform representative LUT (or other compressed transform representative data structure) to image data for any purpose; much less teach the use of any type of image data file having a compressed transform representative data structure attached thereto.

As indicated in the incorporated patent application, beside being utilized to perform simple tonal re-mappings of monochrome imagery and conversions of color imagery from one color representation into some other representation (as indicated hereinabove), LUTs representing N to M-dimensional transforms can be used for color calibrating input and output devices and for generally converting image data from one representation to another whether color oriented or not.

For background purposes only, it should be noted that some of the more common functional color transforms are described by R. W. G. Hunt in a publication entitled "Measuring Colour", published by John Wiley and Sons, at pages 197–198, and by F. W. Billmeyer, Jr. and M. Saltzman, in a publication entitled "Principles of Color Technology", also published by John Wiley and Sons, at pages 81–110.

Although not constituting a part of the invention per se, methods for generating transform representative LUTs, together with several data compression techniques presently used for image processing purposes, will be briefly described herein for the sake of completeness.

Methods for generating multi-dimensional color calibration tables are well known to those skilled in the art as exemplified by H. J. Trussell in an article entitled "Application of Set Theoretic Methods To Color Systems", published in Color Research and Applications, Volume 16, No. 1, February, 1991, at pages 31–41; and by the teachings of W. F. Schreiber (in U.S. Pat. No. 4,500,919) and P. C. Pugsley (in U.S. Pat. No. 4,307,249).

According to these references, look-up tables may be generated using measured visual color responses from color patches with known device colors. The mapping of the visual color response to the device color to reproduce the color response at the output of a given device is then implemented with a look-up table.

As for data compression techniques per se, which are well known in the prior art to support a variety of image processing applications, such techniques may best be described (in general terms for background purposes only) as coupled processes consisting of a data transformation followed by quantization and encoding. The data transform pre-processes the data to effect a new, more compact data representation.

The pre-processed data can then, for example, be quantized, as taught by J. R. Sullivan in U.S. Pat. No. 4,885,636, and T. J. Lynch in the publication entitled "Data Compression Techniques and Applications", published by Van Nostrand Reinhold; and encoded using, for example, lossless encoding techniques (as taught by D. A. Huffman in an article entitled "A Method for the Construction of Minimum Redundancy Codes", published in the Proceedings of the IRE, Volume 40, at pages 1098–01101, and as taught by Lempel et al in an article entitled "A Universal Algorithm for Sequential Data Compression", published in the IEEE Transactions On Information Theory, Volume IT-23(3), at pages 337–343); arithmetic coding (as taught in an article entitled "Q-Coder" appearing in the IBM Journal of Research and Development, in Volume 32(6), at pages 715–840); or some other desired encoding algorithm.

As indicated hereinabove, with the exception of the teachings set forth in the incorporated patent application, the known data compression techniques, applied in the image processing context, have only been used to compress image data per se; not the transform representative LUTs which are stored for use in processing input image data in either compressed or uncompressed form.

It should be noted that well known compression methodologies, such as differential pulse code modulation (DPCM) and discrete cosine transform (DCT), may be readily extended to span the N to M-dimensional space described by the look-up tables. As an example, due to the correlated and smoothly varying nature of color transformation tables, predictive and interpolative techniques are attractive in transforming such look-up table data into a compact representation. However, alternate techniques may be used to produce the compact LUTs without departing from the spirit or scope of the invention.

Specific techniques which may be used to compress the transform representative LUTs include, for example, hierarchical, lossless, or lossy compression techniques, depending on the nature of the transform data.

Hierarchical methods would allow for multi-resolution reconstruction of the LUTs. Lossless techniques may be used for compressing calibration data that cannot incur any numerical loss. However, there are situations in which some numerical loss may be acceptable, such as where the transform data is inherently noisy or over specified in terms of visual precision of color differences. In these situations a lossy compression method may be most suitable for use, with the advantage of producing an increased compression ratio.

In view of the state of the art and other reasons set forth hereinabove, it would be desirable to provide methods and apparatus (image processing devices and systems), which are capable of selectively attaching to image data, compressed transform representative data (such as a compressed transform representative LUT), stored in memory available to an image processing device or system.

Once providing methods and apparatus for attaching stored compressed transform representative data to image data, it would clearly be desirable to provide methods and apparatus capable of using the product of the attachment process, namely image data with compressed transform representative data attached thereto.

In particular, it would be desirable to provide methods and apparatus which are capable of being able to utilize image data which has compressed transform representative data attached thereto, for image processing purposes such as, for example, device calibration and/or image data transformation functions.

Still further, it would be desirable to provide methods and apparatus which are capable of performing both the aforementioned attachment and utilization functions.

Further yet, it would be desirable to provide methods and apparatus which support the use of compressed transform representative data structures not resident in a given image processing device or system. So long as the target device is able to recognize that the image data being presented includes attached compressed transform representative data, all the target device would need to do (to be able to apply the desired transform), is detach and decompress the transform representative data sent with the image data, and apply the transform specified thereby.

By attaching compressed transform representative data to image data, there is the added flexibility of remotely processing image data (using the attached compressed transform representative data), without having to know the nature of the transform per se; just the encoding scheme used to compress the transform representative data.

The aforementioned desirable methods and apparatus not only offer memory savings possibilities in the devices and systems in which compressed transform representative data is used; but also would provide the flexibility of allowing one of many user specified transforms to be attached to image data by a first image processing device or system, to be used by some other image processing device or system.

Thus, for example, an input device (such as a scanner) may have a plurality of compressed color calibration tables stored in the device itself, each associated with one of a plurality of image rendering devices to which the image data may be sent. One of these tables may, in accordance with the teachings of the present invention, be user selected and attached to a scanned image based, for example, on the user's knowledge of the particular image rendering device to which the image data will be sent. The image rendering device may then decompress the calibration table attached to the image data and perform the intended device calibration function.

SUMMARY OF THE INVENTION

Accordingly, it is a primary object of the invention to provide methods and apparatus for selectively attaching to image data, compressed transform representative data (such as a compressed transform representative LUT), stored in memory available to an image processing device or system.

It is a further primary object of the invention to provide methods and apparatus capable of using the product of the aforementioned attachment process, namely image data with compressed transform representative data attached thereto, to perform image processing functions.

In particular, it is an object of the invention to provide image processing devices and systems which utilize the aforementioned methods and apparatus to perform device calibration and/or image data transformation functions.

Furthermore, it is an object of the invention to provide methods and apparatus which enable image processing devices and systems to process image data with attached compressed transform representative data, without having to recognize the nature of the specific transform being applied. This feature is sometimes referred to hereinafter as "transform independent" image processing; requiring only that the image processing device or system have knowledge of the compression scheme used to originally generate the compressed transform representative data attached to the image data being processed.

Another object of the invention is to provide methods and apparatus which are capable of performing both the aforementioned attachment and utilization functions referred to in the aforestated objects.

Further yet, it is an object of the invention to provide methods and apparatus which support the use of compressed transform representative data structures not resident in a given image processing device or system.

Still another object of the invention is to provide methods and apparatus which enable selected compressed transform representative data structures to be attached to image data by a first image processing device or system, to be used by some other image processing device or system.

Yet another object of the invention is to provide methods and apparatus for processing image data which conserve memory resources by utilizing stored compressed, and/or attached compressed, transform representative data for image processing purposes.

Further still, it is an object of the invention to provide methods and apparatus which may be readily integrated into existing image processing devices and systems to allow compressed N to M-dimensional transformations to be stored, be selectively attached to image data, and be utilized to process image data for the various exemplary (and other) purposes indicated herein.

In accordance with one aspect of the invention, each LUT in a set of LUTs (where each LUT represents an N TO M-dimensional transform which could be applied to the input data), is stored in compressed form in storage means included in, or which is otherwise accessible to, the image processing device or system. Each stored compressed LUT may then, according to one embodiment of the invention, be selectively attached (appended) to the image data being processed by the image processing device or system.

According to a further aspect of the invention, image data which has compressed transform representative data attached thereto (such as one of the aforementioned compressed transform representative LUTs), may be processed utilizing methods and apparatus operative to: (a) detach the compressed LUT from the image data; (b) decompress the detached LUT (if not otherwise available in decompressed form to transform processing means being utilized to process the image data); (c) decompress the image data (if presented to the image processing device or system in compressed form); and (d) apply the transform represented by the decompressed LUT, utilizing the aforementioned transform processing means, to a decompressed version of the image data.

The result of the aforementioned process is for the transform processing means to have available as output, image data transformed in accordance with the transform represented by the compressed LUT previously attached to the image data.

A specific preferred embodiment of apparatus contemplated by the invention is an image processing device for attaching compressed N to M-dimensional transform representative data, stored in memory means associated with the image processing device, to image data input to the image processing device, comprising: (a) means for inputting image data; and (b) means for attaching the compressed N to M-dimensional transform representative data to the image data.

In an alternate embodiment of the invention, the memory means associated with the image processing device, used for storing the compressed N to M-dimensional transform representative data, could be included as part of the image processing device per se.

Whenever an image processing device contemplated by the invention includes, in storage means associated therewith, a plurality of N to M-dimensional compressed transform representative data structures, the device also includes means for allowing a given compressed transform representative data structure to be selected (by a user or automatically), from the storage means for attachment to said image data.

Another specific preferred embodiment of apparatus contemplated by the invention is an image processing device for applying a preselected transform to image data, having compressed transform representative data (representing the preselected transform) attached thereto, comprising: (a) means for detaching the compressed transform representative data from the image data; (b) means for decompressing the compressed transform representative data; and (c) means for applying the preselected transform, represented by the decompressed transform representative data, to the image data input to the image processing device.

Yet another embodiment of the invention is designed to include means for decompressing the image data itself, whenever the image data is presented in compressed form.

The invention is also directed to corresponding methods used to perform the functions of the various embodiments of apparatus described herein.

For example, one method contemplated by the invention comprises the steps of: (a) inputting image data to an image processing device; and (b) attaching compressed N to M-dimensional transform representative data, stored in memory means associated with the image processing device, to the image data.

Another example of a method contemplated by the invention, envisioned (for example) as being practiced at a device that receives image data with compressed transform representative data attached thereto, comprises the steps of: (a) detaching compressed transform representative data from the image data; (b) decompressing the compressed transform representative data; and (c) applying the preselected transform, represented by the decompressed transform representative data, to the image data input to the image processing device.

The invention also encompasses devices and systems which, for example, can perform both the attachment and utilization functions referred to hereinabove, and which realize the other objectives recited hereinbefore. The only limitations intended to the methods and apparatus within the scope of the invention will be those expressly set forth in the claims.

It should be noted that although a principal aspect of the invention is to provide methods and apparatus which utilize N TO M-dimensional transform representative data structures (in particular, LUTs), stored in compressed form in some type of storage device; the technique used to compress these structures is not a part of the instant invention per se except (as indicated hereinbefore) to the extent that decompression of a given compressed data structure requires information concerning how the structure was originally compressed.

As indicated hereinabove, many different well known compression techniques may be used, for example, to compress a LUT and include hierarchical, lossless, and lossy techniques, assumed for the purposes of the present invention to be performed offline.

The invention features methods and apparatus which may be readily integrated into existing image processing devices and systems to allow compressed N to M-dimensional transformations to be stored, be selectively attached to image data, and be utilized to process image data for the various purposes, several of which have been cited herein by way of example.

The invention also features the ability to perform "transform independent" image processing (as defined hereinabove), in a wide range of image processing devices and systems. This feature allows "non-resident" compressed transform representative data structures to be used by image processing devices and systems contemplated by the invention.

These and other objects, embodiments and features of the present invention and the manner of obtaining them will become apparent to those skilled in the art, and the invention itself will be best understood by reference to the following detailed description read in conjunction with the accompanying drawing.

DETAILED DESCRIPTION

Figure 1:
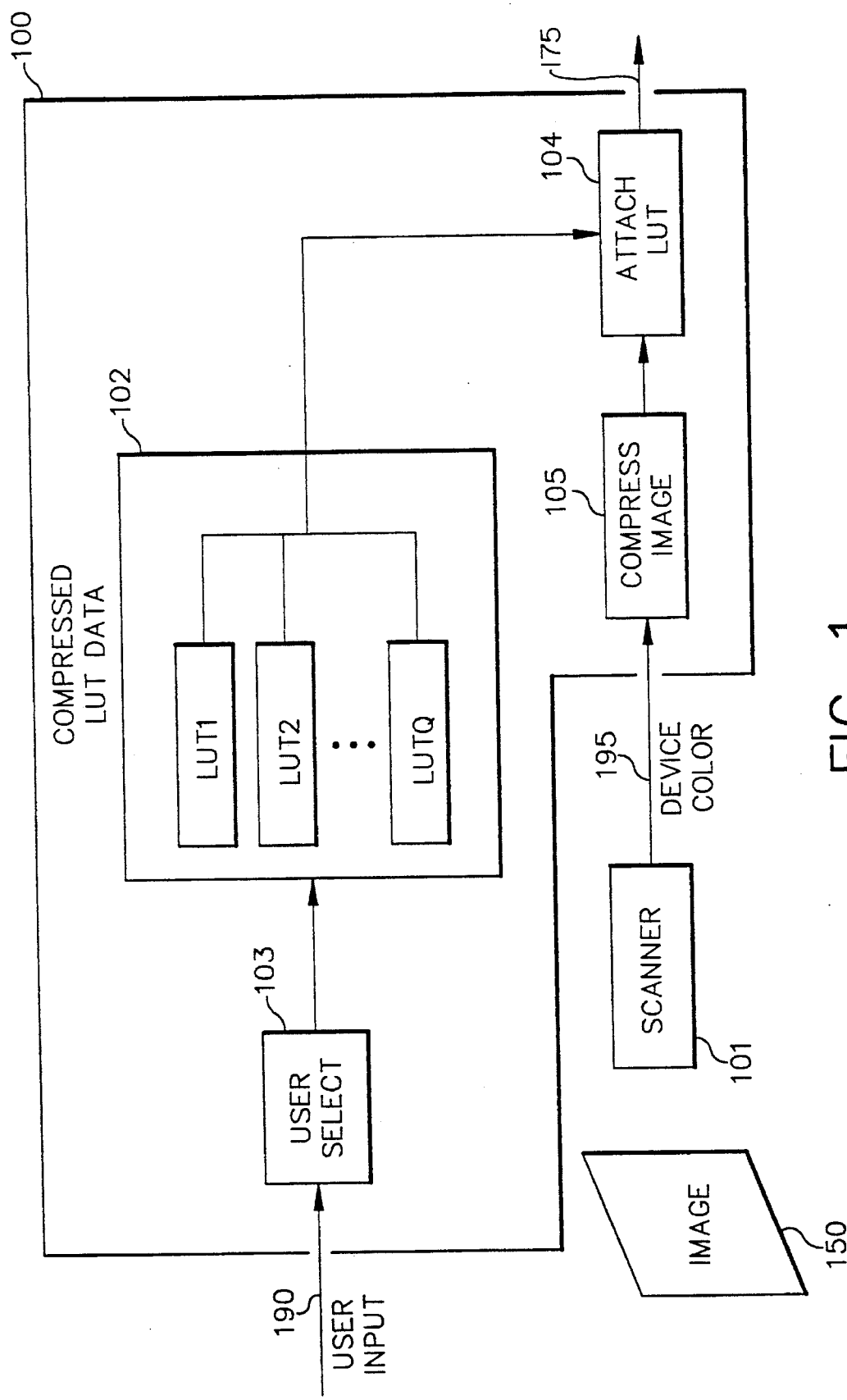
FIG. 1 depicts, in the form of an equipment block diagram (which also serves as a process flow chart), the components of an exemplary image processing device for selectively attaching stored compressed transform representative data structures (in particular, compressed LUTs), to image data input to the image processing device.

Reference should now be made to FIG. 1 which, as indicated hereinbefore, depicts (in the form of an equipment block diagram which also serves as a process flow chart), components of exemplary image processing device 100 contemplated by one aspect of the invention.

Image processing device 100, as shown in FIG. 1, may be used to select any one of the depicted Q compressed transform representative LUTs for attachment to the image data. The image data, with a compressed transform representative LUT attached thereto, may then be stored, be further processed, or be used by a downstream device coupled to image processing device 100, such as image processing device 200 depicted in FIG. 2.

Figure 2:
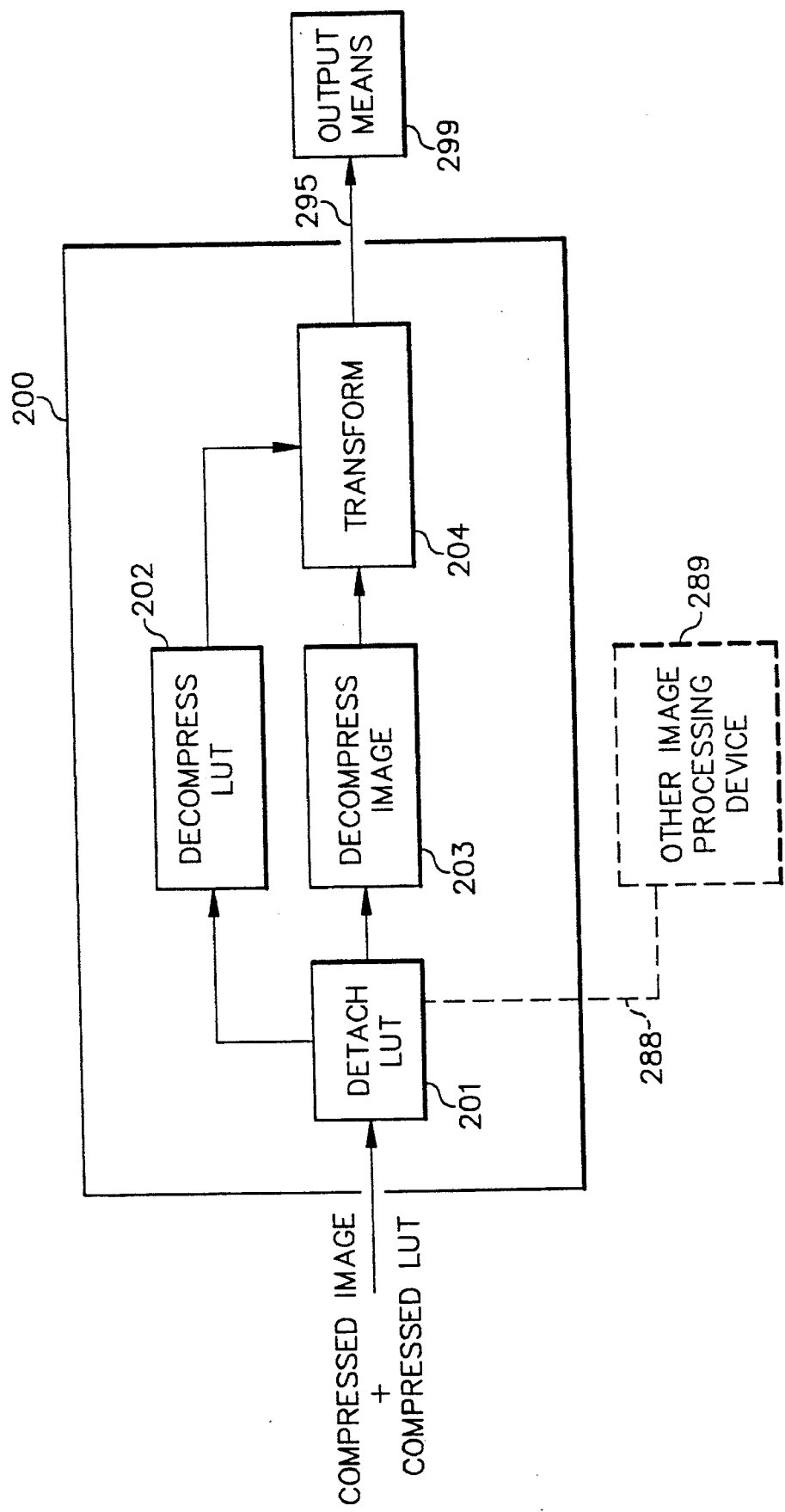
FIG. 2 depicts, in the form of an equipment block diagram (which also serves as a process flow chart), the components of another exemplary image processing device contemplated by the invention. The device depicted in FIG. 2 may be used for detaching compressed transform representative image data (attached to image data), and for utilizing the detached information, in accordance with the teachings of the invention, for image processing purposes.

Image processing device 200 shown in FIG. 2 may function together with image processing device 100 as part of a single system; or may function as a completely separate device. In either case, image processing device 200 may be used to practice several of the teachings of the invention beyond those illustrated and described with reference to FIG. 1, and will therefore be separately described in detail hereinafter.

For the sake of illustration only, the block diagram shown in FIG. 1 represents image processing device 100 as having a plurality of compressed LUTs stored on board. According to the illustrative embodiment of the invention being set forth with reference to FIG. 1, these LUTs may be selectively attached to the image being scanned. The compressed LUTs are assumed to be generated offline and may be compressed utilizing any of the aforementioned encoding algorithms ranging from lossless to lossy encoding, and from single layer to hierarchical encoding.

Image processing device 100, as depicted in FIG. 1, is shown following scanner 101 which is being used to capture image 150. Scanner 101 may, for example, be realized by a commercially available camera system, such as the Kodak Professional DCS 200ci Digital Camera (which is purely a data capture type device), or other types of data input means (such as a digitizer, general purpose work station implemented using a personal computer, etc.), which include data storage and/or processing capabilities.

The image data input means and the imaging processing device (or system) contemplated by the invention, may be separate units as shown in FIG. 1 (scanner 101 and image processing device 100 are shown as separate units coupled by link 195). However, the image processing components depicted as part of device 100 in FIG. 1 may be included as part of image data input means per se, so long as sufficient memory and processing power are resident in or associated with the input means to enable the invention to be practiced in the manner described hereinafter.

FIG. 1 goes on to show, in accordance with the teachings of a preferred embodiment of the invention, a set of Q compressed transform representative LUTs (i.e., at least one compressed LUT), stored on board device 100 in storage means 102. The invention does not require that the set of compressed transform representative LUTs be stored within the image processing device per se (as shown in FIG. 1). All that is required is that the image processing device have access to the means for storing this set of LUTs.

Also depicted in FIG. 1 (as part of image processing device 100) are user transform select means 103, processing means 104 (for actually attaching the selected compressed LUT), and optional image data compression means 105, for compressing input image data online. A well known technique for compressing image data online is the JPEG standard DCT algorithm which may be readily implemented in software, or a combination of hardware and software, by those skilled in the art. Commercially available chips may be used to perform the DCT function.

In a typical image processing device and scanner combination (such as the combination depicted in FIG. 1), the scanned data is represented in a device specific color representation. The image data is either compressed or left uncompressed depending on the nature of the application. The compression scheme used for compressing the image data may or may not be the same as that used to compressed the transform representative data structure.

User transform select means 103 (which may be easily realized, for example, using a software switch), is intended to provide a mechanism for allowing user input (or automated input), as shown on link 190, to be utilized to select one of the Q compressed transform representative LUTs stored in storage means 102, for attachment to the image data presented to processing means 104. Again, the image data in FIG. 1 is shown provided to processing means 104 via input means (such as scanner 101), after being optionally compressed by image data compression means 105.

Input image data (compressed or uncompressed) is normally provided to a device like processing means 104, in a bit serial fashion. The selected compressed transform may, for example, be appended in bit serial fashion to the image data bit stream (by processing means 104), or may be placed in (i.e., be attached to) an image data file containing the input image data.

The image data file (or bit stream) with the compressed transform representative data structure attached, may then be output by image processing device 100 over, for example, link 175.

As indicated hereinbefore, the image data with the compressed transform representative data structure attached, may be further processed, stored, and/or transmitted, depending on the nature of the device or system in which the attaching function was performed, after being output on link 175.

Reference should now be made to FIG. 2 which depicts, in the form of an equipment block diagram (which also serves as a process flow chart), the components of another exemplary image processing device contemplated by the invention.

The exemplary image processing device 200 depicted in FIG. 2 is shown receiving compressed image data with a compressed transform representative data structure (a compressed LUT) attached. Image processing device 200 is also shown driving output means 299 via link 295. Output means 299 may, for example, be realized by a commercially available printer, such as the Kodak XL7720 printer (which is a digital thermal dye transfer device having a special purpose CPU on board for image manipulation), or other types of data output means which may or may not include data storage and/or processing capabilities. In fact, the output of device 200, appearing on link 295, may be simply be stored or subject to further processing stages rather than being directed to an image rendering device.

The image data output means and the image processing devices (and systems) contemplated by the invention, may be separate units as shown in FIG. 2 (output means 299 and image processing device 200 are shown as separate units coupled by link 295). However, the image processing components depicted as part of device 200 in FIG. 2 may be included as part of image data output means per se, so long as sufficient memory and processing power are resident in or associated with the output means to enable the invention to be practiced in the manner described herein.

The functional components shown to be included in image processing device 200 are (a) means 201 for detaching the compressed transform representative data structure (a compressed LUT in the example depicted in FIG. 2) from the image data (to which it is attached) presented to device 200; (b) means 202 for decompressing the detached LUT; (c) optional means 203 for decompressing the image data whenever compressed image data is presented to device 200; and (d) means 204 for applying the transform represented by the decompressed LUT to a decompressed (or uncompressed) version of the image data.

The arrangement of components 201–204 in FIG. 2, illustrates how a composite image file (or data stream) generated by an image processing device of the type shown in FIG. 1, may be decomposed and processed. Components 201–204 will be described functionally hereinafter and may be implemented individually, or in combination, by using commercially available data processing means, such as microprocessor chips, personal computing systems, microprocessor boards, etc. Software to drive such processing devices to perform the functions described hereinafter, may be readily prepared by those skilled in the art once the device functions are understood.

Means 201, according to a preferred embodiment of the invention, functions to recognize situations where image data input to device 200 has a compressed transform representative data structure attached thereto. This may readily be accomplished by incorporating, for example, header information in the image data file.

Use of header information is standard practice in the field of data processing and can be used, for example, to include a bit or bits indicating the presence of a compressed data structure, the type of structure presented (e.g., a compressed LUT), the size and location of the structure in the image data file, a compression code indicating the compression scheme used to compressed the transform representative data structure, etc.

In the event means 201 determines that no compressed transform representative data structure is attached to the input image data, the input file could be passed directly to some other processing device as indicated by dashed link 288, coupling means 201 and device 289 in FIG. 2.

Once detached, the compressed LUT (for the example depicted in FIG. 2), is decompressed by means 202 which by convention or some other means (such as using the aforementioned compression code), knows how to decompress the LUT. As indicated hereinbefore, all that is required by means 202 is information regarding how the original transform representative data structure was compressed.

Assuming compressed image data is presented to image processing device 200, means 203 will decompress the image data, online. A well known technique for decompressing image data online is the JPEG standard DCT algorithm which may be readily implemented in software, or a combination of hardware and software, by those skilled in the art. Once again, commercially available chips may be used to perform the DCT function.

Finally, image data in a decompressed (or uncompressed) form is presented to transform processing means 204 which may be used, according to the invention, to apply the decompressed transform representative LUT (generated by means 202) to the image data input to transform processing means 204. The result is that the image data presented to transform processing means 204 is transformed from one representation to another as specified by the detached, decompressed transform representative LUT.

As previously indicated, the detached, decompressed transform may, for example, be used to convert image data from a device independent color space into a device dependent color space (for example, the color space recognized by output means 299), and may also be used to perform other types of user defined transforms, calibration functions, etc. The apparatus depicted in FIG. 2 could, for example, be used to transform image data from a device dependent color space, e.g., RGB of scanner 101 depicted in FIG. 1, to another device dependent color space such as CMY for output means 299 depicted in FIG. 2.

As indicated hereinbefore, once the image data is transformed by image processing device 200, the output may be further processed, stored, and/or transmitted depending on the nature of the device or system in which the transformation was performed.

For the sake of illustration only, without intending to limit the scope or set of applications for the invention, a commercially available example of an image processing system in all aspects of the invention may be practiced is the Eastman Kodak Company "Premier" System ("Premier" is a trademark of the Eastman Kodak Company). The Premier System is an end to end image editing work station that includes a plurality of image processing devices including a film reader (a scanner), a digitizer, a film writer (an output device), and data processing means.

In the case of the Premier System the data processing means (a Unix based work station), is capable of performing all of the processing functions described herein, namely the functions of processing means 104 (described with reference to FIG. 1) and means 201–204 (described with reference to FIG. 2). The work station also has sufficient memory to accommodate the on board storage of the compressed LUTs (depicted in FIG. 1), and to provide working memory to hold input image data and transform representative data being processed. As indicated hereinabove, other data processing means which may be used to implement the invention taught herein include commercially available microprocessor chips, personal computing systems, microprocessor boards, etc.

Other examples of commercially available devices and systems in which the invention may find direct or indirect application are PhotoCD players, such as Kodak's PCD-870 PhotoCD player, digitizers, film writers, etc., and more generally any type of image processing device or system which utilizes transforms stored as LUTs for image processing purposes. The invention allows a plurality of N TO M-dimensional transformations to be implemented by such devices without having a significant impact on memory requirements.

In the aforementioned exemplary systems, the compressed LUTs can be stored in memory included in, or associated with, a given device or system. As indicated hereinbefore, the choice of the LUT to be attached and/or subsequently decompressed could, for example, be user selected or automatically selected based on user defined criteria using, for example, software switching techniques well known to those skilled in the art.

As indicated hereinbefore, the decompression of a compressed LUT may be implemented in software and may be performed by, for example, the processing unit existing on a given device's imaging platform, by an associated PC, and even by the aforementioned transform processing means (prior to applying the selected transform to image data), etc. Once again, the software for performing the decompression can easily be generated by those skilled in the art assuming the compression technique used to create the selected compressed LUT is known.

Finally, at least in the case of the commercially available devices described herein, the actual transformation of image data (as shown being performed by means 204 in FIG. 2), may be performed by any data processor having access to both the decompressed version of a selected LUT and the image data itself.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, the invention may be applied to image signal processing applications in general, whether in the context of processing video, 3-D or still images, and/or for processing monochrome, multi-spectral and/or multi-band image data.

As a further example, the invention may be practiced, using equipment which is similar to that depicted in FIG. 1, to attach uncompressed transform representative data structures (or some combination of compressed and uncompressed data structures), to input image data. Furthermore, the invention may be practiced, using equipment which is similar to that depicted in FIG. 2, to recognize any uncompressed data structures attached to image data, so that the transforms represented by such structures may also be applied to image data.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. An image processing device for selectively attaching a compressed transform representative data structure, belonging to a set of such structures stored in memory means associated with the image processing device, to image data input to said image processing device, comprising:

(a) means for inputting said image data to the image processing device;

(b) means for selecting at least one of the compressed transform representative data structures stored in said memory means for attachment to said image data; and (c) means for attaching each selected compressed transform representative data structure to said image data.

2. The image processing device as set forth in claim 1 wherein said memory means for storing the set of compressed transform representative data structures is included on board the image processing device.

3. The image processing device as set forth in claim 2 wherein each compressed transform representative data structure belonging to said set of such structures is a compressed look-up table (LUT).

4. The image processing device as set forth in claim 1 wherein said means for selecting further comprises a software switch.

5. An image processing device for attaching compressed N to M-dimensional transform representative data, stored in memory means associated with said image processing device, to image data input to said image processing device, comprising:

(a) means for inputting said image data to the image processing device; and (b) means for attaching the compressed N to M-dimensional transform representative data stored in said memory means to said image data.

6. The image processing device as set forth in claim 5 wherein said memory means for storing said compressed N to M-dimensional transform representative data is included on board the image processing device.

7. An image processing device for transforming input image data from a first representation to another representation by applying a transform represented by compressed transform representative data attached to the image data, comprising:

(a) means for detaching said compressed transform representative data from said image data;

(b) means for decompressing said compressed transform representative data; and (c) means for applying the transform, represented by the decompressed transform representative data, to the image data input to the image processing device.

8. The image processing device as set forth in claim 7 further comprising means for decompressing the image data whenever the image data is input to the image processing device in compressed form.

9. The image processing device as set forth in claim 7 wherein said compressed transform representative data includes a set of compressed look-up tables (LUTs) each representing an N to M-dimensional transform.

10. The image processing device as set forth in claim 7 said compressed transform representative data represents a transform for converting image data from a device dependent color space to a device independent color space.

11. The image processing device as set forth in claim 7 said compressed transform representative data represents a transform for converting image data from a device independent color space to a device dependent color space.

12. The image processing device as set forth in claim 7 said compressed transform representative data represents a transform which may be used for calibrating an image processing device.

13. The image processing device as set forth in claim 7 wherein said means for decompressing is operative to decompress said stored compressed transform representative data only when the decompressed form of said stored compressed transform representative data is not otherwise available to said means for applying.

14. The image processing device as set forth in claim 13 further comprising means for selecting a transform to be applied to said image data in the event said stored compressed transform representative data represents a plurality of transforms.

15. An image processing system for attaching compressed N to M-dimensional transform representative data, stored in memory means associated with said image processing device, to image data input to said image processing device and for transforming image data having compressed N to M-dimensional transform representative data attached thereto from a first representation to another representation by applying the transform represented by the compressed transform representative data attached to the image data, comprising:

(a) means for inputting said image data to the image processing device;

(b) means for attaching the compressed N to M-dimensional transform representative data stored in said memory means to said image data; and (c) means for transforming image data, having compressed N to M-dimensional transform representative data attached thereto, from a first representation to another representation by applying the transform represented by the compressed transform representative data attached to the image data.

16. The image processing system as set forth in claim 15 wherein said means for transforming further comprises:

(a) means for detaching the compressed transform representative data from image data;

(b) means for decompressing said compressed transform representative data; and (c) means for applying the transform, represented by the decompressed transform representative data, to the image data which had the transform representative data attached thereto.

17. A method for attaching compressed N to M-dimensional transform representative data, stored in memory means associated with an image processing device, to image data input to said image processing device, comprising the steps of:

(a) inputting said image data to the image processing device; and (b) attaching the compressed N to M-dimensional transform representative data stored in said memory means to said image data.

18. A method for selectively attaching a compressed transform representative data structure, belonging to a set of such structures stored in a memory means associated with an image processing device, to image data input to said image processing device, comprising the steps of:

(a) inputting said image data to the image processing device;

(b) selecting at least one of the compressed transform representative data structures stored in said memory means for attachment to said image data; and (c) attaching each selected compressed transform representative data structure to said image data.

19. A method as set forth in claim 18 further comprising the step of storing a plurality of compressed N to M-dimensional transform representative data structures in memory means included on board the image processing device.

20. A method for transforming image data input to an image processing device from a first representation to another representation by applying a transform represented by compressed transform representative data attached to the image data, comprising the steps of:

(a) detaching said compressed transform representative data from said image data;

(b) decompressing said compressed transform representative data; and (c) applying the transform, represented by the decompressed transform representative data, to the image data input to the image processing device.

21. A method as set forth in claim 20 further comprising the step of converting image data from a device dependent color space to a device independent color space utilizing compressed transform representative data attached to the image data.

22. A method as set forth in claim 20 further comprising the step of converting image data from a device independent color space to a device dependent color space utilizing compressed transform representative data attached to the image data.

23. A method as set forth in claim 20 further comprising the step of calibrating an image processing device utilizing compressed transform representative data attached to the image data.

24. A method as set forth in claim 20 further comprising the step of decompressing the image data whenever the image data is input to the image processing device in compressed form.

25. A method for attaching compressed N to M-dimensional transform representative data, stored in memory means associated with an image processing device, to image data input to said image processing device and for transforming image data, having compressed N to M-dimensional transform representative data attached thereto, from a first representation to another representation by applying the transform represented by the compressed transform representative data attached to the image data, comprising the steps of:

(a) inputting said image data to the image processing device;
  (b) attaching the compressed N to M-dimensional transform representative data stored in said memory means to said image data; and
  (c) transforming image data, having compressed N to M dimensional transform representative data attached thereto, from a first representation to another representation by applying the transform represented by the compressed transform representative data attached to the image data.

26. A method as set forth in claim 25 wherein said step of transforming further comprises the steps of:

(a) detaching the compressed transform representative data from image data;
  (b) decompressing said compressed transform representative data; and
  (c) applying the transform, represented by the decompressed transform representative data, to the image data which had the transform representative data attached thereto.

* * * * *